United States Patent
Burdett et al.

(10) Patent No.: US 10,692,081 B2
(45) Date of Patent: Jun. 23, 2020

(54) LOCAL MANAGEMENT OF PAYMENT TRANSACTIONS

(75) Inventors: Richard Burdett, Sawbridgeworth (GB); Colin Tanner, Middlesex (GB)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 912 days.

(21) Appl. No.: 12/982,951

(22) Filed: Dec. 31, 2010

(65) Prior Publication Data

US 2012/0173423 A1 Jul. 5, 2012

(51) Int. Cl.
*G06Q 20/40* (2012.01)
*G06Q 20/32* (2012.01)

(52) U.S. Cl.
CPC ......... *G06Q 20/40* (2013.01); *G06Q 20/3223* (2013.01)

(58) Field of Classification Search
CPC ........ G06Q 20/00; G06Q 40/00; G06Q 20/04; G06Q 50/00

(Continued)

(56) References Cited

U.S. PATENT DOCUMENTS

| 3,438,489 A | 4/1969 | Cambornac et al. |
| 4,011,433 A | 3/1977 | Tateisi et al. |

(Continued)

FOREIGN PATENT DOCUMENTS

| EP | 0 254 595 A2 | 1/1988 |
| GB | 2 267 626 A | 8/1993 |

(Continued)

OTHER PUBLICATIONS

"Hashing Credit Card Numbers" by Integrigy, Feb. 27, 2007 (16 pages).

(Continued)

*Primary Examiner* — Gregory A Pollock
(74) *Attorney, Agent, or Firm* — Otterstedt, Wallace & Kammer, LLP

(57) ABSTRACT

It is determined whether a payment device has come into association with a special spending environment. If so, an authorization and guarantee for a predetermined amount of funds to cover multiple transactions within the special spending environment is requested from an issuer of the payment device. If successful, a balance, based on the predetermined amount of funds, is established on a local authorization platform that is associated with the special spending environment and that is separate from the issuer of the payment device. A series of purchases with the payment device, within the special spending environment, is tracked. For each given purchase of the series of purchases, the balance is adjusted to reflect the value of the given purchase. At some point, it is determined that the series of purchases is ended. An additional step includes, subsequent to determining that the series of purchases is ended, communicating with the issuer to request payment as to only that portion of the predetermined amount of funds actually spent in the series of purchases. A further step includes facilitating an immediate release of the guarantee as to that portion of the predetermined amount of funds not actually spent in the series of purchases. The immediate release is subsequent to determining that the series of purchases is ended. A special callback command to summon back funds is also contemplated.

30 Claims, 7 Drawing Sheets

(58) Field of Classification Search
USPC .................................. 705/35–45, 21, 64
See application file for complete search history.

(56) References Cited

U.S. PATENT DOCUMENTS

| | | | |
|---|---|---|---|
| 4,149,394 A | 4/1979 | Sornes | |
| 4,654,658 A | 3/1987 | Walton | |
| 4,849,613 A | 7/1989 | Eisele | |
| 4,891,503 A | 1/1990 | Jewell et al. | |
| 4,899,036 A | 2/1990 | McCrindle et al. | |
| 5,053,774 A | 10/1991 | Schuermann et al. | |
| 5,103,079 A | 4/1992 | Barakai et al. | |
| 5,191,193 A | 3/1993 | Le Roux | |
| 5,206,488 A | 4/1993 | Teicher | |
| 5,285,382 A | 2/1994 | Muehlberger et al. | |
| 5,286,955 A | 2/1994 | Klosa | |
| 5,337,063 A | 8/1994 | Takahira | |
| 5,384,449 A | 1/1995 | Peirce | |
| 5,396,558 A | 3/1995 | Ishiguro et al. | |
| 5,449,894 A | 9/1995 | Bruhnke et al. | |
| 5,479,172 A | 12/1995 | Smith et al. | |
| 5,485,510 A | 1/1996 | Colbert | |
| 5,504,321 A | 4/1996 | Sheldon | |
| 5,566,327 A | 10/1996 | Sehr | |
| 5,679,938 A | 10/1997 | Templeton et al. | |
| 5,717,989 A * | 2/1998 | Tozzoli et al. ............. | 705/37 |
| 5,819,234 A | 10/1998 | Slavin | |
| 5,826,241 A | 10/1998 | Stein et al. | |
| 5,828,044 A | 10/1998 | Jun et al. | |
| 5,917,913 A | 6/1999 | Wang | |
| 6,018,717 A | 1/2000 | Lee et al. | |
| 6,023,682 A | 2/2000 | Checchio | |
| 6,038,552 A | 3/2000 | Fleischl et al. | |
| 6,064,988 A | 5/2000 | Thomas | |
| 6,078,888 A | 6/2000 | Johnson, Jr. | |
| 6,101,477 A | 8/2000 | Hohle | |
| 6,116,505 A | 9/2000 | Withrow | |
| 6,119,945 A | 9/2000 | Muller | |
| 6,154,778 A | 11/2000 | Koistinen | |
| 6,182,894 B1 | 2/2001 | Hackett | |
| 6,226,624 B1 | 5/2001 | Watson | |
| 6,375,084 B1 | 4/2002 | Stanford | |
| 6,394,341 B1 | 5/2002 | Makipaa et al. | |
| 6,398,110 B1 | 6/2002 | Kikuchi | |
| 6,402,038 B1 | 6/2002 | Stanford | |
| 6,422,460 B1 | 7/2002 | Boesch | |
| 6,480,101 B1 | 11/2002 | Kelly et al. | |
| 6,554,183 B1 | 4/2003 | Sticha | |
| 6,651,885 B1 | 11/2003 | Arias | |
| 6,655,587 B2 | 12/2003 | Andrews | |
| 6,675,153 B1 | 1/2004 | Cook | |
| 6,701,303 B1 | 3/2004 | Dunn | |
| 6,732,922 B2 | 5/2004 | Lindgren et al. | |
| 6,749,114 B2 | 6/2004 | Madani | |
| 6,848,613 B2 | 2/2005 | Nielson et al. | |
| 6,850,916 B1 | 2/2005 | Wang | |
| 6,853,987 B1 | 2/2005 | Cook | |
| 6,874,685 B1 | 4/2005 | Moreau | |
| 6,923,371 B2 | 8/2005 | Goodfellow | |
| 6,931,382 B2 | 8/2005 | Laage | |
| 6,934,849 B2 | 8/2005 | Kramer | |
| 6,999,944 B1 | 2/2006 | Cook | |
| 7,003,495 B1 | 2/2006 | Burger | |
| 7,021,532 B2 | 4/2006 | Robinson | |
| 7,039,611 B2 | 5/2006 | Devine | |
| 7,243,076 B1* | 7/2007 | Cardenas .................. | 705/27.1 |
| 7,324,975 B1* | 1/2008 | Grellier .................... | 705/51 |
| 7,566,003 B2 | 7/2009 | Silbernagl et al. | |
| 7,568,617 B2 | 8/2009 | Silbernagl et al. | |
| 7,742,967 B1* | 6/2010 | Keresman et al. ......... | 705/37 |
| 7,828,204 B2 | 11/2010 | Fiebiger et al. | |
| 7,959,076 B1 | 6/2011 | Hopkins, III | |
| 2001/0018660 A1 | 8/2001 | Sehr | |
| 2001/0029494 A1 | 10/2001 | Tomita | |
| 2001/0032878 A1 | 10/2001 | Tsiounis | |
| 2002/0032661 A1 | 3/2002 | Schuba et al. | |
| 2002/0124184 A1 | 9/2002 | Fichadia et al. | |
| 2002/0138445 A1 | 9/2002 | Laage | |
| 2002/0147907 A1 | 10/2002 | Ross | |
| 2002/0156745 A1 | 10/2002 | Tallent et al. | |
| 2002/0161729 A1 | 10/2002 | Andrews | |
| 2002/0170959 A1 | 11/2002 | Madani | |
| 2002/0174013 A1 | 11/2002 | Freeman et al. | |
| 2003/0055786 A1 | 3/2003 | Smith, Jr. | |
| 2003/0061163 A1 | 3/2003 | Durfield | |
| 2003/0074317 A1 | 4/2003 | Hofi | |
| 2003/0088777 A1 | 5/2003 | Bae et al. | |
| 2003/0101096 A1 | 5/2003 | Suzuki | |
| 2003/0101137 A1 | 5/2003 | Wronski | |
| 2004/0039694 A1 | 2/2004 | Dunn | |
| 2004/0128258 A1 | 7/2004 | Su | |
| 2004/0153396 A1 | 8/2004 | Hinderer | |
| 2004/0193541 A1 | 9/2004 | Lasater | |
| 2004/0230535 A1* | 11/2004 | Binder .................. | G06Q 20/04 |
| | | | 705/64 |
| 2004/0238624 A1 | 12/2004 | Nakano | |
| 2004/0243510 A1 | 12/2004 | Hinderer | |
| 2005/0044039 A1 | 2/2005 | Greer | |
| 2005/0055316 A1* | 3/2005 | Williams .................. | 705/65 |
| 2005/0131826 A1 | 6/2005 | Cook | |
| 2005/0149455 A1 | 7/2005 | Bruesewitz et al. | |
| 2005/0184145 A1 | 8/2005 | Law et al. | |
| 2005/0216373 A1* | 9/2005 | Weiss et al. .............. | 705/28 |
| 2005/0216405 A1 | 9/2005 | So | |
| 2005/0251446 A1 | 11/2005 | Jiang | |
| 2005/0262026 A1 | 11/2005 | Watkins | |
| 2005/0269398 A1 | 12/2005 | Robinson | |
| 2006/0031161 A1 | 2/2006 | D'Agostino | |
| 2006/0049258 A1 | 3/2006 | Piikivi | |
| 2006/0208065 A1 | 9/2006 | Mendelovich | |
| 2006/0278704 A1 | 12/2006 | Saunders et al. | |
| 2007/0012763 A1 | 1/2007 | Van de Velde | |
| 2007/0168260 A1 | 7/2007 | Cunescu | |
| 2007/0262139 A1 | 11/2007 | Fiebiger | |
| 2008/0033880 A1* | 2/2008 | Fiebiger et al. .......... | 705/44 |
| 2008/0116264 A1 | 5/2008 | Hammad et al. | |
| 2008/0156873 A1 | 7/2008 | Wilhelm et al. | |
| 2008/0203151 A1 | 8/2008 | Dixon | |
| 2009/0171682 A1 | 7/2009 | Dixon | |
| 2010/0036524 A1 | 2/2010 | Chirco | |
| 2010/0153249 A1* | 6/2010 | Yuan et al. ............... | 705/34 |
| 2010/0205050 A1 | 8/2010 | Wolfe | |
| 2010/0205092 A1* | 8/2010 | Reid et al. ............... | 705/40 |
| 2010/0229245 A1* | 9/2010 | Singhal ..................... | 726/28 |
| 2010/0318463 A1* | 12/2010 | Reany et al. ............. | 705/44 |
| 2010/0332387 A1 | 12/2010 | Tanner | |
| 2011/0017820 A1 | 1/2011 | Fiebiger et al. | |
| 2012/0011062 A1 | 1/2012 | Baker | |
| 2013/0185167 A1* | 7/2013 | Mestre et al. ............ | 705/21 |

FOREIGN PATENT DOCUMENTS

| | | |
|---|---|---|
| JP | 06-215009 | 8/1994 |
| JP | 07-262455 | 10/1995 |
| JP | 2003-067484 | 3/2003 |
| JP | 2006-244227 | 9/2006 |
| WO | WO 94/22115 | 9/1994 |
| WO | WO 97/00501 | 1/1997 |
| WO | WO00/02150 | 1/2000 |
| WO | WO01/43095 | 6/2001 |
| WO | WO 2006/124808 A2 | 11/2006 |
| WO | WO 2006/124808 A3 | 11/2006 |
| WO | WO 2007/090027 A2 | 8/2007 |

OTHER PUBLICATIONS

"Hash Function" by Wikipedia, downloaded from http://en.wikipedia.org/wiki/Hash_function on Oct. 22, 2009 (9 pages).
"Payment Card industry (PCI) Data Security Standard (DSS) and Payment Application Data Security Standard (PA-DSS) Glossary", Ver. 1.2, Oct. 2008 (14 pages).
"Skiers now can pay for bus ride with a 'blink'" by Nicole Warburton of Deseret Morning News, Dec. 7, 2006 (2 pages).

(56) References Cited

OTHER PUBLICATIONS

"ISO/IEC 4909: Identification cards—Financial transaction cards—Magnetic stripe data content for track 3", First edition, Jul. 1, 2006 (21 pages).

"ISO/IEC 7812-1: Identification cards—Identification of issuers—Part 1: Numbering system", Second Edition, Sep. 15, 2000 (11 pages).

"ISO/IEC 7813: Information technology—Identification cards—Financial transaction cards", Sixth edition, Jul. 1, 2006 (12 pages).

"ISO/IEC 7816-5: Identification cards—Integrated circuit cards—Part 5: Registration of application providers", Second edition, Dec. 1, 2004 (13 pages).

"ISO/IEC 7816-6: Identification cards—integrated circuit cards—Part 6: interindustry data elements for Interchange" Second edition May 15, 2004 (26 pages).

Bistrich, Austrian Patent Office, International Search Report for International Application No. PCT/KR96/00061, dated Jul. 29, 1996, 6 pages, Vienna, Austria.

"Query data faster using sorted hash clusters" by Scott Stephens, Jul. 27, 2005, downloaded May 21, 2009 (1 page).

"ISO/IEC 7816-4: Identification cards-integrated circuit cards—Part 4: Organization, security and commands for interchange", Second edition, Jan. 15, 2005 (90 pages).

Wikipedia, Keycard lock, downloaded Jul. 9, 2012 from http://en.wikipedia.org/wiki/Key_card.

Wikipedia, Stored-value card, re-directed from Transit Card, downloaded Jul. 9, 2012 from http://en.wikipedia.org/wiki/Transit_card.

"Top-Up Card" Apr. 13, 2010 downloaded from http://web.archive.org/web/20100413134103/http://english.bzwbk.pl/128600.

"PremiumTop-Up Card" Mar. 2, 2009 downloaded from http://web.archive.org/web/20090302102604/http://english.bzwbk.pl/3495.

"Pre-Paid Cards" Jan. 25, 2010 downloaded from http://web.archive.org/web/20100125200613/http://english.bzwbk.pl/38134.

"Near field communication" downloaded from http://en.wikipedia.org/wiki/Near_field_communication on Jun. 11, 2012.

Intellectual Property Office of the Republic of China (Taiwan), Office Action dated Jun. 13, 2013, application No. 096103369, with English Translation.

\* cited by examiner

LOCAL MANAGEMENT OF PAYMENT TRANSACTIONS

FIELD OF THE INVENTION

The present invention relates generally to the electronic and computer arts and, more particularly, to apparatus and methods for electronic payment.

BACKGROUND OF THE INVENTION

Cash alternatives such as payment cards are used in a variety of environments. In order to ensure the cardholder has sufficient funds or credit to make a purchase, an authorization can be sought for every pending sale. An approval for a sale is ordinarily sent to the merchant's point of sale (POS) equipment from a card-issuing financial institution that verifies the availability of funds or credit in the cardholder's account.

Some spending environments are characterized by frequent cardholder transactions, most of which are relatively low in value. These environments also typically demand high transaction speeds and solution reliability. One proposed solution for addressing such demands is to automatically approve a transaction the first time a cardholder's account number is utilized at a merchant location. Subsequent to such "approval," an authorization request can be generated.

Proprietary "closed loop" systems that do not involve interbank fund transfers provide for the local processing of transactions. Authorization from an issuer such as a bank or credit union is not required by such systems. In "open loop" systems, balances are ordinarily held on the card issuer's server or as a pre-authorized balance on the actual payment card.

SUMMARY OF THE INVENTION

Principles of the invention provide techniques for local management of payment transactions.

In one aspect, an exemplary method includes determining whether a payment device has come into association with a special spending environment; responsive to the determining step being affirmative, requesting, from an issuer of the payment device, an authorization and guarantee for a predetermined amount of funds to cover multiple transactions within the special spending environment; and, responsive to success of the authorization and guarantee, establishing a balance, based on the predetermined amount of funds, on a local authorization platform that is associated with the special spending environment and that is separate from the issuer of the payment device. Further steps include tracking a series of purchases with the payment device, within the special spending environment; for each given purchase of the series of purchases, adjusting the balance to reflect a value of the given purchase; and determining that the series of purchases is ended. An additional step includes, subsequent to determining that the series of purchases is ended, communicating with the issuer to request payment as to only that portion of the predetermined amount of funds actually spent in the series of purchases. A further step includes facilitating an immediate release of the guarantee as to that portion of the predetermined amount of funds not actually spent in the series of purchases. The immediate release is subsequent to determining that the series of purchases is ended.

In another aspect, another exemplary method includes determining whether a payment device has come into association with a special spending environment; responsive to the determining step being affirmative, requesting, from an issuer of the payment device, an authorization and guarantee for a predetermined amount of funds to cover multiple transactions within the special spending environment; and, responsive to success of the authorization and guarantee, establishing a balance, equal to the predetermined amount of funds, on a local authorization platform that is associated with the special spending environment and that is separate from the issuer of the payment device. Additional steps include tracking a series of purchases with the payment device, within the special spending environment; for each given purchase of the series of purchases, adjusting the balance to reflect a value of the given purchase; obtaining, from an issuer of the payment device, a special callback command; and, responsive to obtaining the callback command, performing a callback adjustment on the balance.

In another aspect, a local authorization platform apparatus, associated with a special spending environment having at least one terminal, includes a memory, and at least one processor, coupled to the memory. The at least one processor is operative to carry out or otherwise facilitate any one, some, or all of the method steps in either of the methods just described.

In an even further aspect, another exemplary method includes obtaining, by an issuer of a payment device which has come into association with a special spending environment, from a local authorization platform that is associated with the special spending environment and that is separate from the issuer of the payment device, a request for an authorization and guarantee for a predetermined amount of funds to cover multiple transactions within the special spending environment; responsive to the request, providing an affirmative authorization response to the local authorization platform and reserving a sum correlated to the predetermined amount of funds; obtaining, by the issuer of the payment device, from the local authorization platform, a message which requests payment as to only that portion of the predetermined amount of funds actually spent in a series of purchases; initiating the payment; and immediately releasing that portion of the sum not actually spent in the series of purchases.

In yet a further aspect, yet another exemplary method includes obtaining, by an issuer of a payment device which has come into association with a special spending environment, from a local authorization platform that is associated with the special spending environment and that is separate from the issuer of the payment device, a request for an authorization and guarantee for a predetermined amount of funds to cover multiple transactions within the special spending environment; responsive to the request, providing an affirmative authorization response to the local authorization platform and reserving a sum correlated to the predetermined amount of funds; determining that at least a portion of the sum is needed in connection with another matter; responsive to the determining step, issuing a special callback command to the local authorization platform; and releasing at least the portion of the sum for the another matter.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention can provide substantial beneficial technical effects, including facilitating the economic acceptance of low value electronic payment transactions, providing risk management for such transactions unencumbered by possible delays of communicating on each and every transaction with the bank or credit union, and/or significantly reducing the risk of system failure due to communication issues with the bank or credit union.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
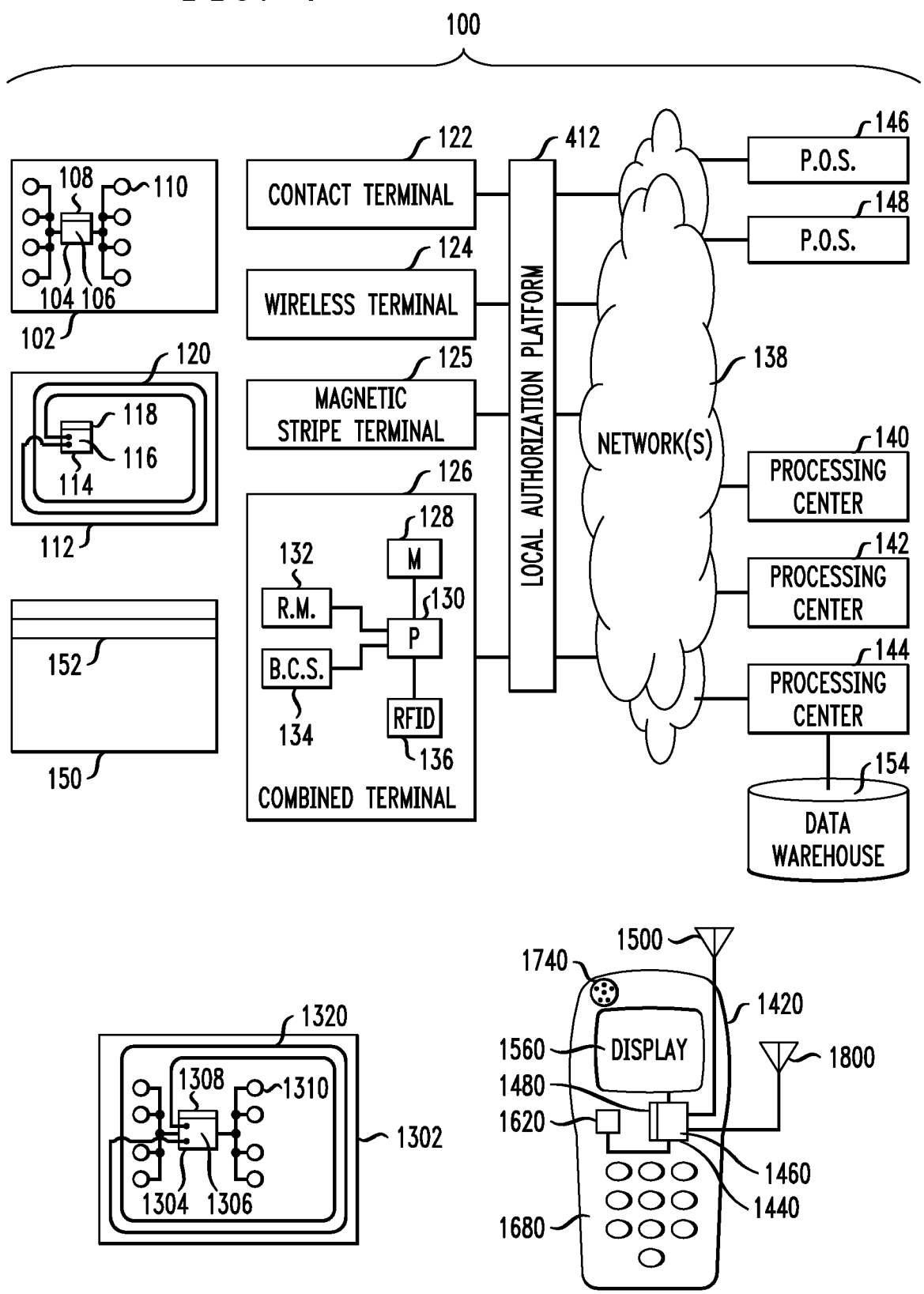
FIG. 1 shows an example of a system and various components thereof that can implement techniques of the invention.

Attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited. St. Andrews House. The Links. Kelvin Close. Birchwood, Warrington, WA3 7PB. United Kingdom) Alternatively. JAVA CARD™-based operating systems, based on JAVA CARD™ technology (licensed by Sun Microsystems. Inc. 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

As noted, cards 102, 112 are examples of a variety of payment devices that can be employed. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. In some cases, the cards, or other payment devices, can include body portions (e.g., laminated plastic layers of a payment card, case or cabinet of a PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDS) linked to software code in the form of firmware plus data in a card memory such as an electrically erasable programmable read-only memory (EE-PROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g. contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

In one or more versions of the infrastructure, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

An appropriately configured cellular telephone handset 1420 can also be employed in infrastructure 100. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 similar to above-described antenna 120 (i.e., the handset could have a second antenna for the payment application). Note that antenna 1800 is depicted schematically, but could be, e.g., a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided.

The description of devices, elements, or components 102, 104, 106, 108, 110, 112, 114, 116, 118, 120 throughout this document are equally applicable to the corresponding items in the dual interface card 1302 and cellular telephone handset 1420.

Local authorization platform 412 is discussed below.

Figure 2:
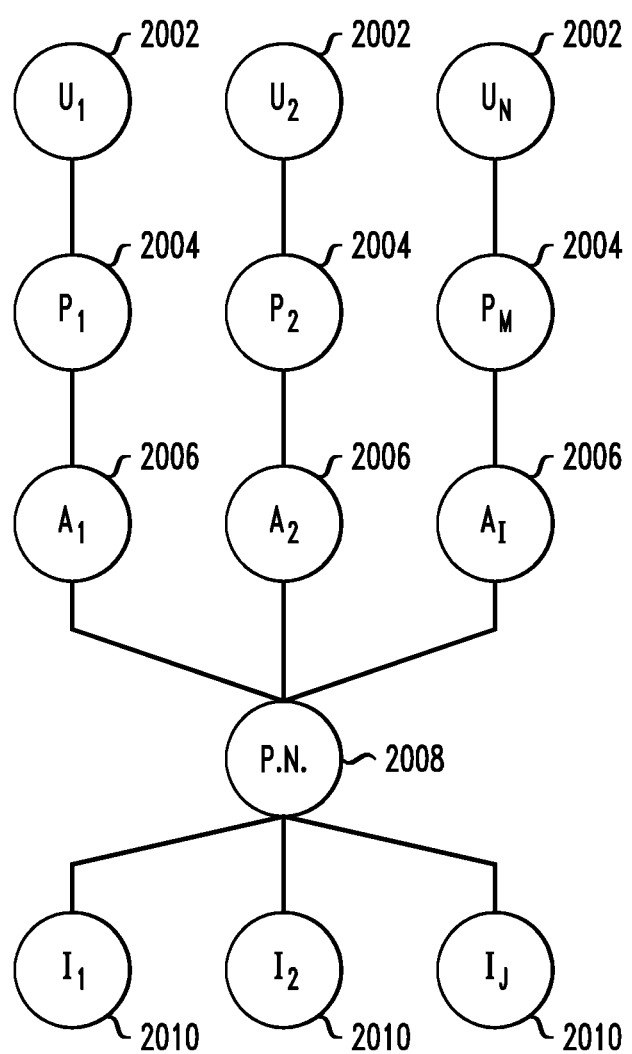
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g. consumers) 2002. $U_1, U_2 \ldots U_N$, interact with a number of different merchants 2004. $P_1, P_2 \ldots P_M$. Merchants 2004 interact with a number of different acquirers 2006. $A_1, A_2 \ldots A_I$. Acquirers 2006 interact with a number of different issuers 2010. $I_1, I_2 \ldots I_J$, through, for example, a single operator 2008 of a payment network configured to facilitate transactions between multiple issuers and multiple acquirers; for example. MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches." which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. In other instances, a payment network configured to facilitate transactions between multiple issuers and a single acquirer could be used. Some embodiments of the invention may be employed with other kinds of payment networks, for example, proprietary or closed payments networks with only a single issuer and acquirer, such as a closed loop store or gift card, where the card is issued by the merchant for use only within their stores. Other embodiments of a closed loop solution may include a card issued at an event or festival on behalf of the event/festival organizer which may only then be used within that event or festival.

Note that the complete disclosure of co-assigned U.S. patent application Ser. No. 12/832,288 of inventors Aaron Baker and Colin Tanner, filed Jul. 8, 2010, and entitled "Apparatus and Method for Dynamic Offline Balance Management for Preauthorized Smart Cards." is expressly incorporated herein by reference in its entirety for all purposes.

One or more embodiments of the invention allow multiple sales transactions to be conducted with a payment device without the need for obtaining authorization from an outside entity, such as the issuer of the payment device, for each transaction. One or more instances provide techniques for allowing, or disallowing payment transactions in an open loop system without the need to seek authorization in real time from the issuer of a payment card or other payment device.

As noted above, the total funds available to the cardholder are generally located on a payment device or an issuer's server. An on-line balance located at the issuer's server may not be ideal at merchant locations that cannot support high speed on-line authorizations or where fast throughput requirements exist. A balance stored on a card or other payment device allows fast throughput, but introduces other issues such as the inconvenience of issuing a new card or replenishing an existing card when the balance is low. Moreover, not all payment devices support fund balances. As used herein, an "on-line" transaction is one which undergoes a conventional authorization request and authorization response process with the issuer (understood to also include an issuer processor acting on the issuer's behalf).

In accordance with one or more embodiments, a preauthorized balance is held on a local authorization platform such as a local server within a special spending environment and is secured by a payment scheme as discussed below.

A number of venues such as stadiums, festivals, pubs, night clubs, theme parks and holiday parks have high transaction volume. Multiple transactions from the same cardholder over a defined period of time are common in such venues. Systems and techniques as disclosed herein facilitate such transactions while allowing risk management and providing a level of issuer access and control.

Figure 3:
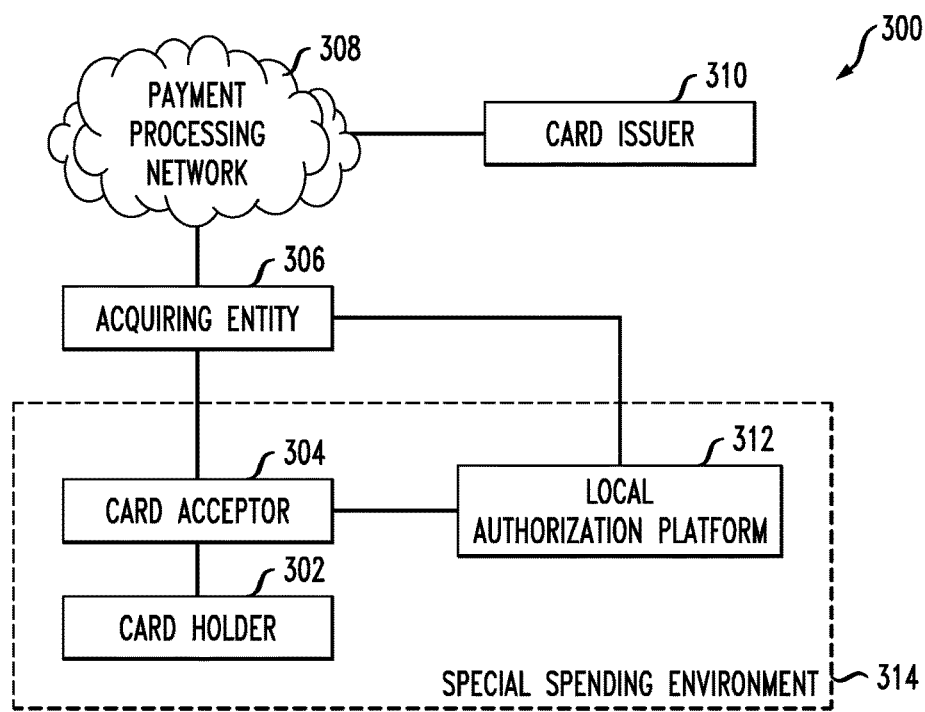
FIG. 3 shows an example of an open system including a local authorization platform in accordance with an aspect of the invention.
Figure 4:
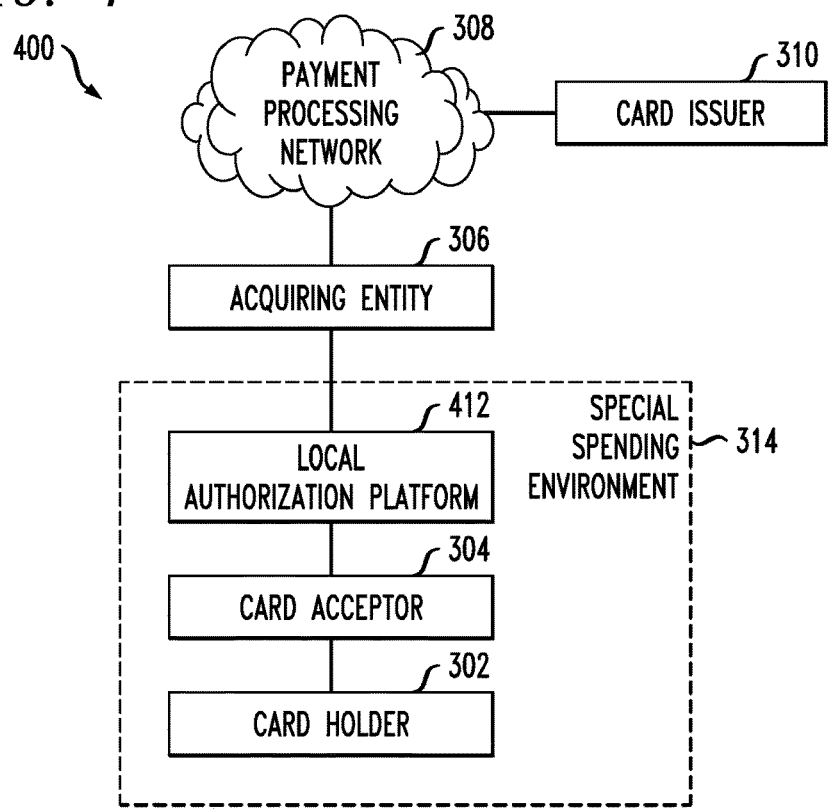
FIG. 4 is shows a second example of an open system including a local authorization platform in accordance with another aspect of the invention.

Referring to FIGS. 3 and 4, two similar systems for facilitating electronic payments are shown. In the system 300 shown in FIG. 3, a card holder 302 is a person in possession of a payment device such as a credit, debit or prepaid card (note that, as used herein, unless the context would indicate otherwise, reference to a "credit" card is also applicable to a debit card or prepaid card, and to payment devices with non-card form factors). The card may be any of the types of cards 102, 112 or 150 described above. Again, it will be appreciated that the payment device is not necessarily in the form of a card (e.g. could include appropriately configured PDA, cell phone handset, wristband, key fob, or the like). A card acceptor 304 includes a merchant or the like; block 304 in FIG. 3 represents one or more terminals of such an entity that are capable of interacting with one or more types of cards or other payment devices, such as the terminals 122, 124, 125 and 126 shown in FIG. 1. The card acceptor is configured to communicate electronically with an acquiring entity 306 that receives payment transactions. Such entities perform various functions; for example, as described above with respect to FIG. 2, including interacting with one or more card issuers 310. Communication with the card issuer is through a payment processing network 308. In some instances, the network 308 functions in a similar fashion as network 2008 discussed above; in other cases, it performs analogous functions for systems not having multiple issuers and/or multiple acquirers.

In the embodiment of FIG. 3, the card acceptor is configured to electronically communicate with both the acquiring entity 306 and a local authorization platform 312, which itself can communicate with the acquiring entity 306. As described below, communication with the local authorization platform facilitates payment transactions and obviates the need for communicating with the card issuer for every payment transaction between card holder 302 and card acceptor 304. In some cases, the configuration of FIG. 3 is useful as a backup solution, wherein the local risk management is only used if the link to the acquiring entity fails. In normal operation of such a backup solution, the local authorization platform just monitors transactions in order to build a risk profile for the card. For example, a venue such as a stadium might have a fiber optic link to the acquirer and thus be able to carry out full authorization for each transaction. In this case, the local authorization platform runs in a standby risk-management mode and if the high-speed link to the acquirer is lost, the local authorization platform steps in to carry out risk management. In such cases, the local authorization platform may not have a pre-authorized local balance thereon, but may, for example, provide the detailed local receipt function as described elsewhere herein. A variety of risk management techniques could be employed. For example, if the given payment device has been successfully used for a predetermined number of prior transactions in the venue (say, purely for example, three), then it may be deemed an acceptable risk to allow additional transactions locally while the link to the acquirer is not functioning.

In at least some embodiments, the card holder 302 and the terminal(s) of card acceptor 304 are collocated in a special spending environment 314. Furthermore, local authorization platform 312 is also collocated in the special spending environment 314 or else linked thereto by a high-speed (i.e., fast enough to avoid processing delays associated with a conventional authorization request and response to and from an issuer) connection.

In the system 400 of FIG. 4, the local authorization platform 412 is interposed between the terminal(s) of card acceptor 304 and the acquiring entity 306. Other components function in a similar manner as in FIG. 3. Both systems (i.e., 300 and 400) provide for communication between the card issuer 310 and the local authorization platform 312, 412 (typically via the acquiring entity 306; in some instances, such as "store cards" or cards issued just for a particular venue or event, the acquiring entity and the issuer may be one and the same, in what is typically known as an "on us" transaction). The local authorization platform includes one or more computing devices sufficient to execute the functions described below and to store information relating to locally-held cardholder balances, and will be discussed further below.

It should be noted at this point that not all transactions will go through the acquiring entity as independent transactions. In many cases the Acquirer will see only consolidated transactions. Furthermore, in one or more embodiments, a risk management profile on the local authorization platform will determine which transactions are handled locally, and which are sent to the Acquirer. In some cases, the solution may choose to send any transaction above a set (or dynamic) value to the Acquirer, regardless of any pre-authorized balance. If that fails however it would, in at least some instances, use the pre-auth balance and top up the transaction with a further smaller auth as required. In at least some cases, terminals would make no decisions, nor would they be pre-configured for local authorization or authorization to the issuer; the local authorization platform would be configured to make this determination, and indeed to make all decisions. Note, however, that in some cases some processing capability might be located on the terminals; for example, a white list and/or black list could be stored and checked locally by the terminal, at least in the case where communication between the terminal and local authorization platform is lost, disrupted, or degraded. Indeed, it will be appreciated that in a number of environments, robustness and durability of the system is a significant requirement, and therefore, due consideration should be given, when designing the system, to distribute some functionality out to the terminals such that failure of a component such as the local authorization platform does not prevent the system from continuing to provide at least some level of functionality.

Figure 5A:
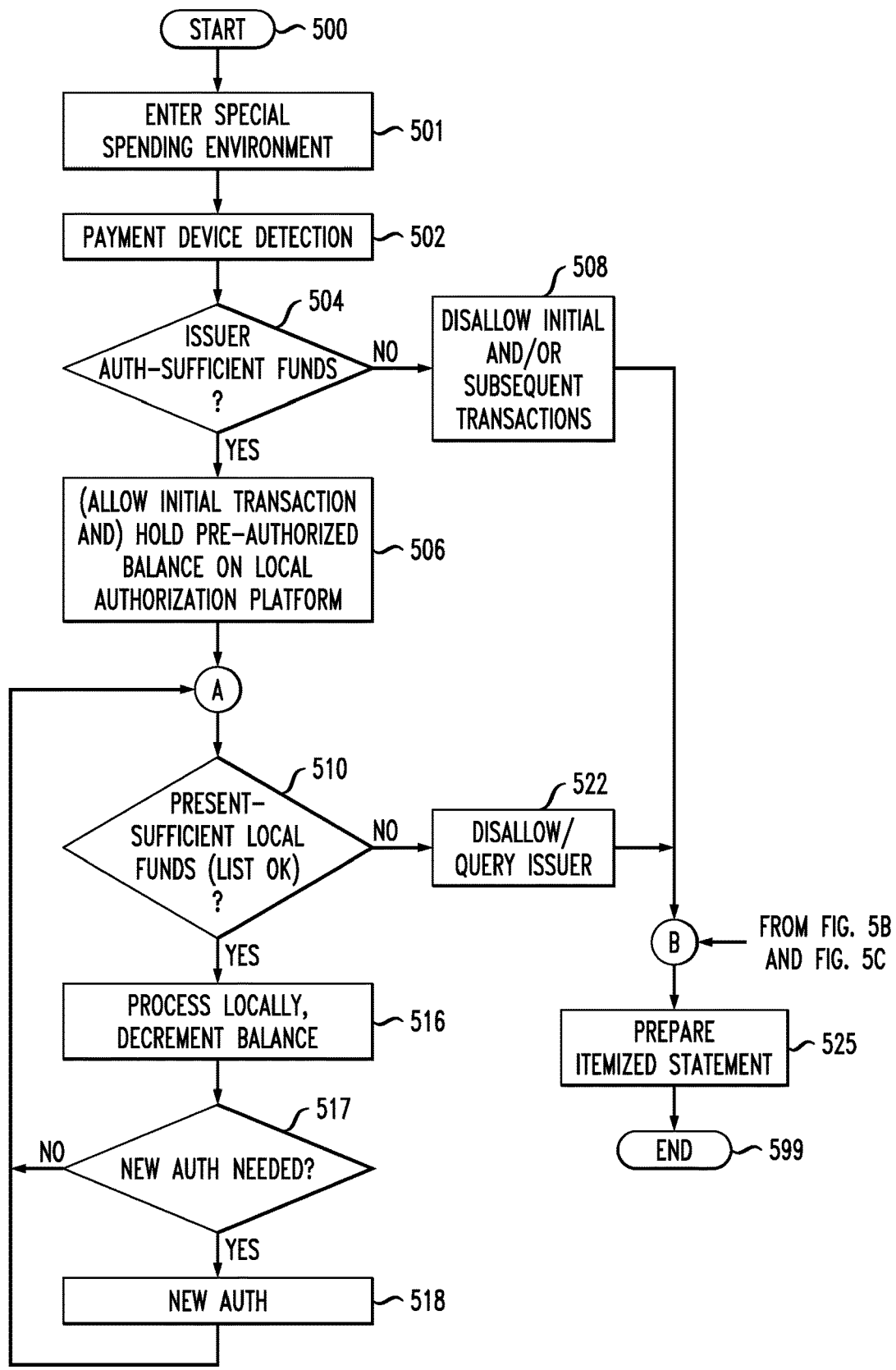
FIGS. 5A-5C present a flow chart illustrating a sequence of steps performed in practicing certain aspects of the invention.
Figure 5B:
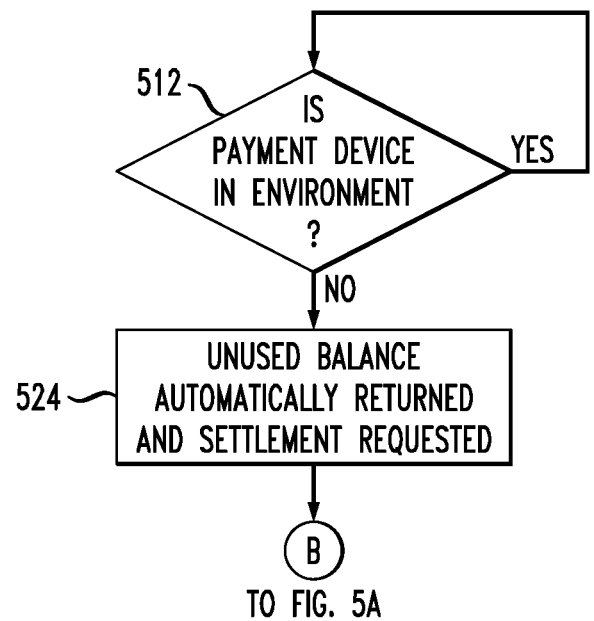
Figure 5C:
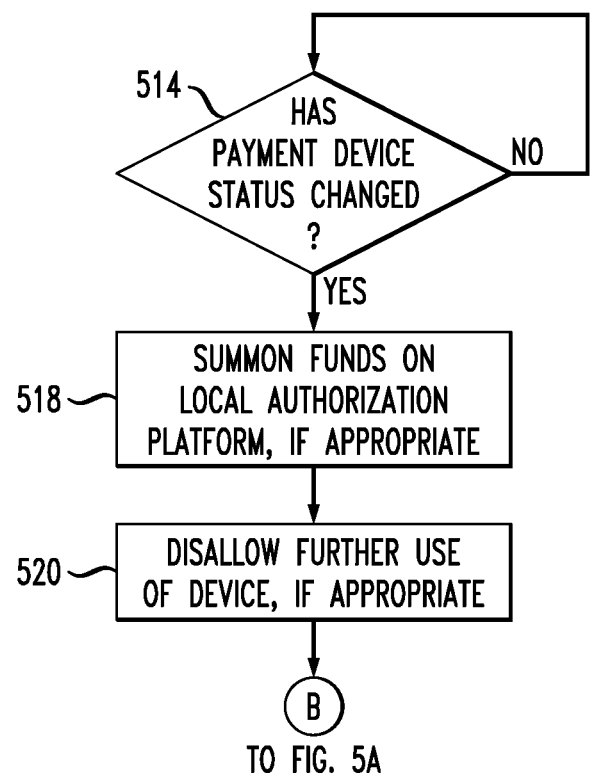

FIGS. 5A-5C provide a flow chart illustrating how either system 300, 400 can be configured to operate to provide high payment transaction speeds for people using payment devices. High transaction speeds are particularly beneficial in certain special spending environments that are characterized by high transaction volumes, relatively low value purchases, and limited time durations spent by cardholders in such environments. A special spending environment may accordingly include such venues as stadiums, festivals, pubs, night clubs, theme parks, holiday parks, or any other environment which is essentially closed.

Note that not all embodiments necessarily require, or are motivated by, "high" transaction speeds; in some cases, in addition to or in lieu of "high" transaction speeds, aggregation to minimize cost and bandwidth use otherwise associated with many separate transactions may be of interest.

The flow chart begins at 500 in FIG. 5A. The process can begin upon (i.e., at the moment of entering, or when entry is imminent) or after the step 501 of entry into a special spending environment where a payment device can be employed.

The step 502 of payment device detection involves detecting the presence of a payment device in the special spending environment. Such detection can be performed in a number of possible ways. A card may be used to enter the environment and detected upon such entry by the user swiping a card if the card has a magnetic stripe. RFID detection may be used upon entry if the customer has a payment device having an IC chip. Payment transactions upon entry are not required for payment device detection. Another possible technique is to determine the presence of the card in the special spending environment upon its first use in a payment transaction. A third technique involves issuing a card or other payment device within the special spending environment only for use therein. As discussed elsewhere herein, in some cases, an additional technique includes use of location based services; for example, in the case of a mobile phone, it may be possible to detect that it has entered the environment via the global positioning system (GPS), via cell tower triangulation or access, and the like.

Once the payment device has been detected, authorization ("auth") and possibly payment is sought. In most cases (e.g. open loop) only an authorization will be sought initially. However for closed loop schemes, which do not support the concept of authorizations, it may be that the actual cardholder balance is moved from a central server to the local server once a cardholder is detected in the environment. The step 504 of issuer authorization includes requesting authorization for a predetermined amount of funds expected to cover multiple transactions within the special spending environment. If there are sufficient funds or sufficient credit available, the issuer will approve a balance to be held on the local authorization platform 312 or 412 for the predetermined amount of funds pursuant to step 506, following the "YES" branch of decision block 504. If the user has made a transaction, this transaction is also allowed. If there are insufficient funds or credit to cover the predetermined amount, subsequent transactions in the special spending environment will be disallowed in step 508, following the "NO" branch of decision block 504, and after which flow proceeds to point "B." There will be no balance and therefore no funds available to the card holder on the local authorization platform 312 or 412. Authorization for the pre-authorized balance can be sought automatically in response to determining the payment device is within the special spending environment. Such authorization can be sought immediately upon such determination or after a selected period of time spent within the special spending environment. "Within" the special spending environment should be broadly construed to cover actual and imminent presence within such an environment.

With further reference to step 508, in at least some instances, within the environment, if a transaction is not authorized, the cardholder will be requested to visit customer services; if funds are running low and the next authorization with the bank has failed, the cardholder will also be asked to speak with customer services.

The local authorization platform is configured and operative to communicate with the issuer 310; typically via the payment processing network 308. Assuming sufficient funds are held in the local authorization platform and the status of the payment device has not changed, additional transactions within the special spending environment will be authorized and processed by the local authorization platform in steps 510 and 516 (flow from "YES" branch of 510), allowing (typically, rapid) transaction authorizations as it is unnecessary to again seek authorization from the issuer. A series of purchases can accordingly be authorized, processed and tracked locally as the user employs the payment device in the special spending environment.

If 510 yields a "NO." flow proceeds to 522, wherein the putative transaction is disallowed, and flow proceeds to point "B." Note that block 510 could, in some instances, also include checking against a "hot" list stored on or in association with the local authorization platform; the putative transaction is approved only if there are adequate funds and the "hot list" test is passed.

Referring now to FIG. 5C, which can, in some instances, be a parallel logical process to at least portions of that in FIG. 5A, the status of the payment device may change following initial authorization from the issuer in step 504 even if no further transactions within the special spending environment take place. For example, the payment device may be reported lost or stolen. Another possibility is the issuer receiving an authorization request from another source (for example, holder makes an Internet transaction using a laptop computer and the account associated with the payment device, while within the special spending environment) and insufficient funds remain on its (i.e., the issuer's) server (i.e., credit limit would be exceeded by Internet transaction if credit card account; insufficient available funds for Internet transaction if debit card account; insufficient balance for Internet transaction if a prepaid or other account of the type where a balance is stored on the issuer's server). In such cases, the issuer can communicate with the local authorization platform to limit or terminate the user's ability to use the payment device in the local spending environment.

In the case of an open loop system, a special transaction type could be used to authorize funds such that the issuer knows that the funds will be held as a local pre-authorized balance. As part of the authorization request, details may be provided to the issuer such that they can contact the system requesting the auth to cancel/terminate the holding of the balance if required. For example, in a normal transaction, the authorization request typically includes a data field specifying the category of goods being purchased (for example, via the merchant category code "MCC"). In one or more non-limiting exemplary embodiments, a flag in the existing authorization request could be set to indicate the special transaction type, or a different type of authorization request (for example, having a different message type indicator "MTI" than a standard authorization request) could be used.

In the event the payment device is reported lost or stolen, no further access to the balance in the local authorization platform is allowed and/or all (remaining) funds are summoned back to the issuer. If there are insufficient funds on the issuer's server following an authorization request from another source, the issuer, knowing the amount held on the local server is not a normal purchase but rather a temporary hold, can send a command to the local authorization platform summoning back the entire balance or only the portion of the balance necessary to complete the transaction from the other source. Step 514 is accordingly typically performed by the local authorization platform and will yield a "YES" following a possible communication from the issuer (otherwise, the process of FIG. 5C awaits a status change, as per the "NO" branch of block 514). If the status has indeed changed, a determination is made in step 518 as to whether funds on the local authorization platform should be summoned back. In addition or alternatively, step 520, disallowing further use of the payment device, can be executed. Flow then proceeds to point B in FIG. 5A. An attempt to use the payment device will accordingly be disallowed if there are insufficient funds or if the issuer has disallowed further use of the payment device for some appropriate reason. In some cases, the mere depletion of the local balance can be anticipated, as per decision block 517, and a re-charge of the local balance can be requested from the issuer in step 518 prior to the depletion, such that, as long as the balance on the issuer's server is sufficient, no transactions need to be declined merely due to using up the local balance. If a new auth is not needed, as per the "NO" branch of block 517, flow returns to point A, as it also does after a successful new auth (block 518 having been reached via the "YES" branch of block 517).

An advantage of the above-referenced system and process is that it is very easy for the issuer's server and a local server functioning within the local authorization platform to communicate either during a transaction or between transactions. The local server can then act as a local proxy for the issuer's server, allowing risk management and authorizations for most transactions to be undertaken within the special spending environment without the need of seeking authorizations in real time from the issuer's server which is remote to the special spending environment. Such an approach also allows for transaction aggregation, which in the case of low value transactions can help to significantly benefit the businesses of all parties involved. Any pre-authorized balance held on the local server is known to the issuer through the use of a transaction code or identifier, and the issuer has the ability to send communications via the banking network to manage the data in the local server. Both risk management and high transaction speeds are accordingly provided.

Referring to FIG. 5B, which can also, in some instances, be a parallel logical process to at least portions of that in FIG. 5A, a determination is made at the local authorization platform in step 512 as to whether the payment device remains in the special spending environment. This step occurs subsequent to the initial step 502 of determining the presence of the device, which preferably occurs on entry or shortly following entry to the special spending environment. The subsequent determination step 512 can be made actively and/or passively. For example, the local authorization platform may recognize that the payment device is no longer in the special spending environment if it is used to exit the environment. A terminal 122, 124, 125 or 126 in communication with the local authorization platform could be used for both entry and exit detection as well as payment processing. Additionally or alternatively, if the payment device has not been used for a predetermined amount of time, it may be assumed that it is no longer in the special spending environment (some embodiments may be useful in connection with transit applications; in the case of transit applications, step 512 may be rather "loose" in that the passenger may exit the subway or the like and simply not use the device again in connection with the subway for the aforementioned predetermined amount of time; the lapse of the predetermined amount of time confirms that the device is no longer in the environment, even though it may have physically left the environment quite some time before the predetermined amount of time elapses). Closure of the special spending environment can be used to make a determination that the payment device has left the environment. If the issuer sends a communication to the local authorization platform that the payment device has been used outside the special spending environment, it may be concluded that the payment device is now outside the special spending environment. Once it has been determined ("NO" branch of decision block 512) that the payment device is no longer in the special spending environment, the step 524 of effectuating final settlement of the funds actually spent in the environment and returning any remaining pre-authorized balance to the issuer's server is performed. The account of the payment device user associated with the issuer is preferably immediately adjusted to reflect the portion of pre-authorized funds held by the local authorization platform that was not spent in the special spending environment. Flow proceeds to point B in FIG. 5A.

If the payment device remains in the environment, as per the "YES" branch of decision block 512, checking continues.

It will be appreciated that the step of determining the presence or absence of the payment device can involve detection of objects other than the payment device itself. For example, the presence of a GPS device such as a mobile phone may be detected within the special spending environment, thereby causing authorization of a predetermined amount of funds on the local authorization platform to be accessed via a selected payment device per step 504. The detection of such a GPS device outside the special spending environment would cause step 524 to be performed.

Again, departure from the special spending environment can be determined in a variety of ways. e.g. purchase outside the environment. GPS or other positioning technology, deliberate logout (e.g., tapping out). Other techniques for sensing entry and/or departure include use of an NFC mobile phone which senses where it is. Indeed, the determination as to whether the user has entered or will soon enter a special spending environment can be based on a variety of factors. In some instances, the smart payment device comprises a mobile device (e.g. NFC). Presence within (or absence from) the special spending environment can be based on geographic location; for example, sensed by the smart payment device or sensed by a location-based service (device may not have GPS or the like but may communicate with its environment and determine location in such manner).

In some instances, the user may have, or be given the opportunity, to choose a number of settings for his or her card, such as the preauthorization amount. Furthermore, in some cases the user may be afforded the opportunity to load the preauthorized amount, for example, via a web site, call center, or the like (i.e., step 502 based on a user request, such as via a text message, visit to a web site, use of an interactive voice response (IVR) system, or the like).

Note that contacted chip cards, contactless chip cards, and/or magnetic stripe cards can all be employed.

Although not shown in FIGS. 5A-5C, in some cases an additional step can include determining if the balance on the local authorization platform is to be used or if a conventional authorization to the issuer is to be carried out for example, for transactions above a certain amount.

One or more embodiments may allow the funds available on the local authorized balance to be based on a particular cardholder's spending history within the special spending environment (or similar environments). Such individual information can be stored either by the issuer (e.g., in data warehouse 154) or on the local authorization platform 312, 412. Upon detecting the presence of a payment device in the special spending environment, authorization would accordingly be sought for an amount deemed appropriate for the particular cardholder. The cardholder may be allowed input with respect to the balance to be held locally; for example, at the discretion of the management of the local spending environment.

It should also be noted that in some instances, establishing a balance on the local server can be a voluntary act of the cardholder who wants to speed up his or her transactions or add to his or her local balance. For example, in the case of a club or membership event, the cardholder may be given control of how the system works. In the case of a theme park, again control may be given. On the issuer side, a cardholder may also be given the option to disallow (opt-out of) any 'pre-authorized' fund requests if he or she chooses. In this regard, the issuer will typically "know" when the (special) authorization request is received that the request is for a balance to be held locally. The issuer, based on previous input from the cardholder and/or on a policy of the issuer, may reject the request and force the card to continue to go on-line (i.e. contact the issuer) for each individual transaction. An issuer might choose to do this, for example, as a policy in the case of a prepaid card with only limited funds available. The issuer may provide a complex authorization request response in which it indicates that while it will not allow the local holding of the balance, it will authorize one or more individual purchases, and/or local holding of a smaller balance. The local authorization platform can store this information and take appropriate action; for example, limit requests for the local balance to the allowable amount and/or seek issuer authorization for all transactions without holding any local balance.

Additional authorizations (typically, with corresponding holds) can be requested from the issuer if the local balance is either depleted or reaches a predetermined minimum amount, as per 517, 518. If the special spending environment includes one or more merchants providing high value products or services, authorization can be sought directly from the issuer rather than the local authorization platform for high value purchases. This will also help avoid depleting the local balance that is intended for purchases having a selected maximum value.

In issuer scripting, a smart card or device executes a script message sent by the issuer and then updates the records located on the smart card or device. Script validation is a process where the card uses a shared secret code (between the card and issuer) to validate that a message has arrived at the card unaltered from the message created by the issuer. In one or more embodiments disclosed in the aforesaid co-assigned U.S. patent application Ser. No. 12/832,288, using this process to ensure the authenticity of the data, the smart card or device updates an offline balance. In one or more embodiments of the present invention, the local authorization platform 312, 412 may be provided with the ability to buffer issuer scripting commands such that such commands can be ready to be delivered to a smart card upon its presentation to a terminal within the special spending environment. Such commands could be used for a variety of purposes, and not merely updating an offline balance.

Point B in FIG. 5A leads to the end 599 of the process. Optionally, as per step 525, another function that may be incorporated in the local authorization platform is the ability to create a detailed local receipt (e.g., itemized statement) and communicate this information to the issuer and/or cardholder. While the statement received by the cardholder from the issuer may only contain the total amount spent within the special spending environment, the cardholder may have access via a mobile text or the web to a detailed receipt of all individual transactions therein. Customer services, or kiosks, may be available within the environment in some instances, and may allow the cardholder to get a printed receipt of his or her spending if required. In a preferred but non-limiting example for these environments, no receipts will be provided at the actual point of purchase.

Other types of functionality may be provided. For example, in some instances, within an environment, a facility may be offered by customer service to put a temporary hold on an account if a card is reported lost. This may not require such strict 'know the customer' requirements as a bank would normally require for blocking an account. This facility could also be reversible if the card was subsequently found and returned to the cardholder. Given that a cardholder may not have full details with him or her at the time of reporting the loss, this may be a valued service by cardholders. This could provide an instant stop of the card's use, even where the card is authorizing the transaction through the use of a "hot" list.

In another aspect, to prevent a lost card from being used for transactions, the cardholder may be asked to enter his or her "PIN" number every $n^{th}$ transaction to confirm that he or she is the correct cardholder. If this is required, it may be performed, for example, away from the payment point (payment terminal), at a kiosk or 'special terminal.' The local authorization platform would then use this 'transaction' as part of its risk management information for when it authorized actual transactions. The requirement to enter the "PIN" periodically (and preferably not in connection with an actual purchase, although where a person forgets to enter the PIN at the kiosk or special terminal, he or she may be afforded the opportunity to do so at the actual payment terminal) could be communicated to the cardholder in a number of ways. For example, the cardholder could be advised upon entering the environment or in a previous paper or electronic communication. A sales clerk operating a terminal could be provided with a display that PIN re-entry would soon be required, and could remind the customer. This functionality may be linked to the above-mentioned facility for where a card has been reported lost, but the person reporting the loss cannot be confirmed as the true cardholder. In this regard, reporting a stolen card to the issuer typically requires significant due diligence in terms of providing the card number, local address, and the like. In one or more embodiments, if there is only "loose" information identifying the purportedly lost or stolen card (e.g. card holder's name), it may still be possible to identify the card by looking up the card in the local authorization platform, based on the name or other "loose" information, and flagging the given card as potentially lost or stolen. In addition to local blocking, another option in such a case would be to force a PIN entry on or before the next use, at the payment terminal, kiosk, or special terminal. This provides a useful option to deal with false reporting, patrons who may be fatigued or intoxicated and thus unable to comply with the usual level of due diligence, or the like.

One or more embodiments thus allow decoupling point of purchase events such as receipts and/or PIN entry. For example, as noted, in some cases, the user must enter his or her PIN every so often, but not necessarily during an actual purchase. With regard to receipts, because of the special nature of the environment, activities independent of purchase may be needed to get a receipt; e.g., a visit to a kiosk, customer services, a web site, or the like. The cardholder's statement from the issuer may just show the aggregated amount and the venue. Furthermore, in a preferred approach, a separate receipt is not issued at the payment terminal for each transaction. Similarly, while it may not be desirable to enter the PIN at the payment terminal, it may nevertheless be required to enter the PIN periodically at a separate kiosk or special terminal. For example, say you visit a theme park—a receipt could be available at a nearby related hotel; using the card and entering the PIN daily at the hotel could be sufficient to authorize transactions for the following day.

Figure 7:
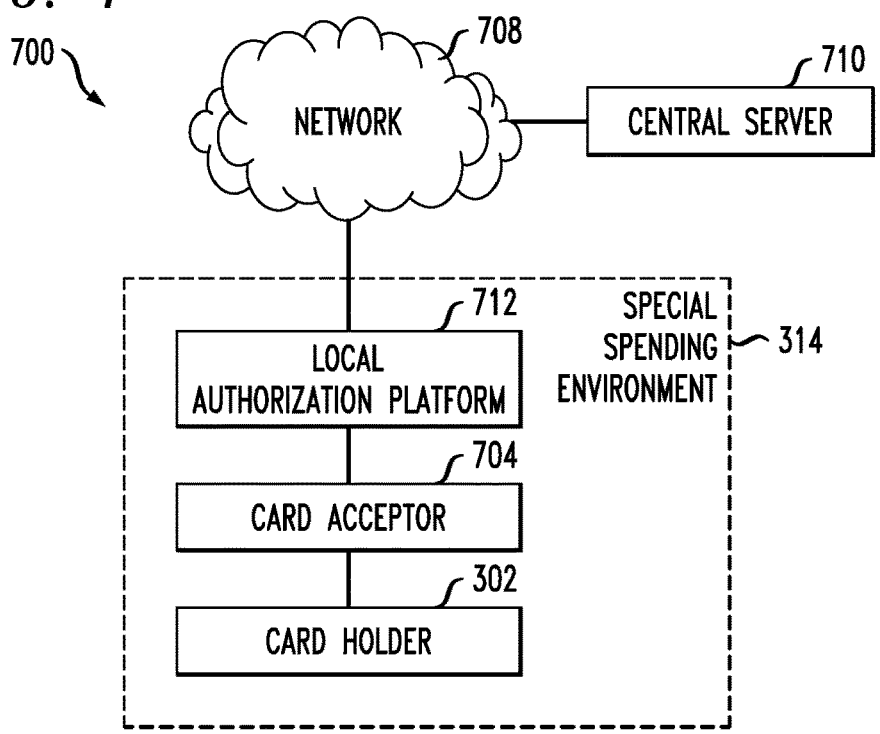
FIG. 7 is a view similar to FIGS. 3 and 4 but for a closed-loop system.

Referring to FIG. 7, an exemplary closed-loop system for facilitating electronic payments is shown. In the system 700 shown in FIG. 7, a card holder 302 holds a closed loop card or other closed loop payment device. A card acceptor 704 includes a merchant or the like; block 704 in FIG. 7 represents one or more terminals of such an entity that are capable of interacting with one or more types of closed-loop cards or other closed-loop payment devices. The card acceptor is configured to communicate electronically a central server 710 of the closed-loop system via a network 708.

In at least some embodiments, the card holder 302 and the terminal(s) of card acceptor 704 are collocated in special spending environment 314. Furthermore, local authorization platform 712 is also collocated in the special spending environment 314 or else linked thereto by a high-speed (i.e., fast enough to avoid processing delays associated with communications with the central server) connection.

In the system 700 of FIG. 7, the local authorization platform 712 is interposed between the terminal(s) of card acceptor 704 and the network 708. The local authorization platform includes one or more computing devices sufficient to execute the functions described herein and to store information relating to locally-held cardholder balances, and will be discussed further below.

Recapitulation

Given the discussion thus far, it will be appreciated that, in general terms, an exemplary method, according to an aspect of the invention, includes the step (see, e.g., step 502 in FIG. 5A) of determining whether a payment device has come into association with a special spending environment 314. As used herein, a special spending environment is any environment which is essentially closed (i.e., single merchant or where all merchants have a relationship) and where multiple transactions are expected. Further, responsive to the determining step being affirmative, an additional step (see, e.g., step 504 in FIG. 5A) includes requesting, from an issuer of the payment device, an authorization and guarantee for a predetermined amount of funds to cover multiple transactions within the special spending environment.

In some instances, the issuer, in response to the request, allocates or reserves funds, typically via a "hold." When authorizing an amount, in some instances, a balance (or credit limit) on a server of the issuer is decremented temporarily, to prevent use of the reserved (held) funds in another transaction. Note that as used herein, including the claims. "authorization and guarantee" should not necessarily be construed as separate but may be accomplished together; for example, an affirmative authorization request response from the issuer may implicitly involve a guarantee of payment by the issuer. Thus, requesting an authorization and guarantee could simply involve submitting a suitable authorization request to the issuer, wherein pre-existing agreement implies that an affirmative response guarantees payment availability. Note also that as used herein, including the claims, requesting the authorization and guarantee "in response" to the determining step being affirmative is intended to cover direct and indirect cases of response (an example of the latter is where the user checks into the environment but auth and hold is only carried out upon presentation for the first purchase).

In a further step (see, e.g., step 506 in FIG. 5A), responsive to success of the authorization and guarantee, establish a balance, based on the predetermined amount of funds, on a local authorization platform 312, 412, 712 that is associated with the special spending environment and that is separate from the issuer of the payment device. The "balance" can be a monetary value, a number of allowable transactions, can be an initial value that is decremented or can work by aggregation towards a final value, and the like. "Separate" from the issuer means that the local authorization platform is physically remote from the issuer's facility and in the special spending environment or coupled to the terminals thereof by a high-speed link. Additional steps include tracking a series of purchases with the payment device, within the special spending environment (see, e.g., block 510 of FIG. 5A); and, for each given purchase of the series of purchases, adjusting the balance to reflect a value of the given purchase (see, e.g., block 510 of FIG. 5A and note that "decrement" therein is a non-limiting example of adjusting).

A still further step includes determining that the series of purchases is ended (see. e.g., FIGS. 5B and 5C and further discussion elsewhere herein). An even further step includes, subsequent to determining that the series of purchases is ended, communicating with the issuer to request payment as to only that portion of the predetermined amount of funds actually spent in the series of purchases (for example, using a conventional clearing and settlement process). A still further step includes facilitating (in some instances, can also be thought of as allowing or permitting) an immediate (e.g., real-time, or near-real-time as opposed to batch) release of the guarantee as to the portion of the predetermined amount of funds that was not actually spent in the series of purchases (the immediate release is subsequent to determining that the series of purchases is ended; the facilitation may include actions prior to and/or subsequent to determining that the series of purchases is ended; an example of a prior act of facilitation is an agreement for the issuer to release the guarantee upon receipt of the payment request; and example of a subsequent act of facilitation is an explicit request for the release). In at least some cases, this leads to an adjustment to a spendable amount associated with the payment device and the issuer. See, discussion of steps 524, 518, and 520. Note that the immediate adjustment reflects that portion of the predetermined amount of funds not actually spent in the series of purchases. Note that the spendable amount associated with the payment device and the issuer could include a server balance for a prepaid card, a demand deposit account balance for a debit card, a credit limit for a credit card, and the like.

In some cases (e.g., open loop systems), the adjustment is not a refund, because the authorization and guarantee is not an actual spend; rather, the adjustment in such cases is the release of the guarantee for funds not actually spent. In some cases, the merchant sends in an actual request for payment of funds that were spent (settlement message) and tells the issuer that they no longer require the remaining guaranteed funds to be available (as discussed below, this latter aspect could be explicit or implicit based on a contractual relationship with predefined rules or the like). In the closed loop case (see discussion of FIG. 7 and portions therein analogous to portions of FIGS. 3 and 4), funds would actually have been transferred across from the central server to the local authorization platform, in which case the adjustment would be an actual return of funds.

As noted elsewhere, determining whether the payment device has come into association with the special spending environment could include, for example, determining whether the payment device has been presented for a purchase within the special spending environment, detecting use of the payment device to enter the special spending environment, and/or locally issuing the payment device only for use within the special spending environment.

With regard to local issuing, a cardholder may have a virtual prepaid account, which on entry to an event is associated with a wristband issued at the event, or the like. In some cases, the user may have a closed loop device associated with a specific venue; for example. Stadium A of Team A. Now, the user attends a road (away) game between Team A and Team B at Stadium B of Team B. The closed loop device associated with Stadium A may not normally work at Stadium B. However, in some embodiments, Team B issues a closed loop device that works in Stadium B and can draw a predetermined sum from the funds associated with the Team A card or device onto a local authorization platform associated with Stadium B. In other cases, the closed loop device associated with Stadium A may be permitted to work at Stadium B (in some cases, only when Team A is visiting Stadium B to play Team B). In this latter case, the special spending environment is, in effect, temporarily extended to include an alternative venue.

As noted elsewhere, determining that the series of purchases is ended could include, for example, determining that the payment device is no longer in association with the special spending environment (e.g. has left or will imminently leave same), determining that the payment device has not been used for a predetermined period of time, detecting attempted use of the payment device outside the special spending environment, determining that the special spending environment has closed, and/or receiving, from the issuer, a special callback command. In this regard, in some instances, one or more embodiments are used in connection with a transit system and/or a group of cooperating transit systems. In the case of transit, leaving the special spending environment may have a rather broad interpretation as discussed elsewhere (e.g., a certain number of days has elapsed since the last use).

As an aside, note that in the case of, for example, prepaid cards, the issuer may choose to block (or limit) the funds that can be authorized and held on third party systems. In some embodiments, the response codes are extended to provide an auth request response that advises the local system information regarding what the issuer will allow for this type of transaction.

In the case of the special callback command, in some instances, the special callback command is received from the issuer in response to at least a portion of the balance established on the local authorization platform being needed elsewhere. This might occur, for example, if the issuer receives an authorization request which cannot receive an affirmative response without the at least portion of the balance established on the local authorization platform (see above example re Internet transaction).

Note that any or all of the steps described can be repeated for additional payment devices that enter the special spending environment, which in the general case can be from multiple issuers. In this regard, the special callback command could be sent to any of these devices as appropriate.

The special callback command could also be issued in response to a security issue, such as a fraudster having the account number or a lost or stolen device.

As noted, the special spending environment could include, for example, a stadium, a festival, a bar, a night club, a theme park, a holiday park, a shopping center, and/or a shopping mall.

Note that the predetermined amount of funds could be specified based upon historical usage data, such an expected average spend in a particular environment, for the population at large, or personalized.

As described with respect to steps 517 and 518, for example, in some cases, an additional step includes, responsive to predetermined diminution of the balance, requesting, from the issuer of the payment device, a further authorization and guarantee for a further predetermined amount of funds to cover additional transactions within the special spending environment. "Diminution" should be broadly construed to cover a balance declining, a tally for an allowed number of transactions going up, or the like.

As discussed with respect to step 510, in some cases, maintain a "hot list" of account numbers on the local authorization platform (e.g., in the memory thereof; "hot list" could be a "white" list of "OK" cards or a "black list" of lost, stolen or invalid cards, or some construction of multiple lists, for example); and allow given ones of the series of purchases only upon a successful check against the hot list. The "hot" list could be periodically updated. See, e.g., co-assigned US Patent Publication 2008-0033880 of Fiebiger et al. entitled "Techniques for authorization of usage of a payment device." for techniques for list maintenance, which the skilled artisan will be able to adapt to one or more embodiments, given the teachings herein. The complete disclosure of the aforementioned US Patent Publication 2008-0033880 is expressly incorporated herein by reference in its entirety for all purposes.

As discussed with respect to step 525, in some cases, make a receipt for the series of purchases available to a holder of the payment device (inasmuch as, due to aggregation, the issuer may not include details on the statement; or the receipt can be made available to the issuer who then passes it on the holder indirectly). The receipt preferably has the details of the individual transactions prior to aggregation.

In some cases, the receipt is not available from a payment terminal within the special spending environment. For example, it may be made available at a kiosk, a special (dedicated) terminal, a customer service desk, a web site, or the like.

In another aspect, in some instances, buffer issuer scripting commands on the local authorization platform (e.g., in a memory thereof), for delivery to the payment device upon presentation of the payment device (i.e., to a terminal) in the special spending environment.

Note that the authorization and guarantee can, in some instances, be requested from the issuer by sending a unique transaction code over a payment processing network.

As noted, in at least some instances, the issuer places a hold against the predetermined amount of funds in response to the request for the authorization and guarantee. The issuer can also, in at least some instances, effectuate the payment as to only that portion of the predetermined amount of funds actually spent in the series of purchases; and immediately release the hold as to that portion of the predetermined amount of funds not actually spent in the series of purchases.

As noted, the immediate release of the guarantee is, in some cases, in response to an explicit communication; in other cases, the immediate release of the guarantee is in response to the request for payment, based on a prior agreement; i.e., implicit since the merchant has entered into an agreement with the issuer.

In some cases, an additional step includes requiring periodic entry of a personal identification number (PIN) to permit the series of purchases to continue. For example, step 510 could also include a check whether the PIN had recently been entered and/or step 517 could also include a check whether the PIN should be re-entered soon. In at least some cases, PIN entry is requested at a location other than a payment terminal.

In still another aspect, an indication might be received that the payment device has been lost and/or stolen. In response, the local authorization platform could be used to require entry of the personal identification number before further use of the payment device within the special spending environment or to refuse further use of the payment device within the special spending environment. For example, checking for a lost or stolen card could also been include in decision block 510.

In an even further aspect, in some cases, determining (e.g., with the local authorization platform), that some putative purchases should not be included in the series of purchases for which the balance is adjusted, but should rather be subject to a conventional authorization process with the issuer. This could be the case for, for example, high-value items such as expensive souvenirs that would too rapidly deplete the local balance. Such a check could also be made in block 510; if the authorization was successful, the process need not flow to B and end but could loop back to A for processing additional (local) transactions.

Furthermore, given the discussion thus far, it will be appreciated that, in general terms, another exemplary method includes the step (see, e.g., step 502 in FIG. 5A) of determining whether a payment device has come into association with a special spending environment 314. Further, responsive to the determining step being affirmative, an additional step (see, e.g., step 504 in FIG. 5A) includes requesting, from an issuer of the payment device, an authorization and guarantee for a predetermined amount of funds to cover multiple transactions within the special spending environment.

In a further step (see, e.g., step 506 in FIG. 5A), responsive to success of the authorization and guarantee, establish a balance, based on the predetermined amount of funds, on a local authorization platform 312, 412 that is associated with the special spending environment and that is separate from the issuer of the payment device. The "balance" can be a monetary value, a number of allowable transactions, can be an initial value that is decremented or can work by aggregation towards a final value, and the like. "Separate" from the issuer means that the local authorization platform is physically remote from the issuer's facility and in the special spending environment or coupled to the terminals thereof by a high-speed link.

Optionally, track a series of purchases with the payment device, within the special spending environment (see, e.g., block 510 of FIG. 5A); and, optionally, for each given purchase of the series of purchases, adjust the balance to reflect a value of the given purchase (see, e.g., block 510 of FIG. 5A and note that "decrement" therein is a non-limiting example of adjusting).

In a further step (see, e.g., step 518), obtain, from an issuer of the payment device, a special callback command; and, responsive to obtaining the callback command, perform a callback adjustment on the balance. The callback adjustment reflects at least part of that portion of the predetermined amount of funds not actually spent in the special spending environment (i.e., all, or some portion of the unspent local balance).

In some cases, the callback adjustment reflects all of that portion of the predetermined amount of funds not actually spent in the special spending environment (i.e., all the unspent local balance is recalled) and a further step includes, responsive to obtaining the callback command, forbidding (see step 520) further spending with the payment device within the special spending environment.

Further aspects include a local authorization platform apparatus, associated with a special spending environment having at least one terminal, including a memory; and at least one processor, coupled to the memory. The at least one processor is operative to carry out or otherwise facilitate any one, some, or all of the method steps described herein. In at least some, cases, instructions for the at least one processor are stored in a tangible, computer-readable, recordable storage medium, or multiple such media.

Figure 8A:
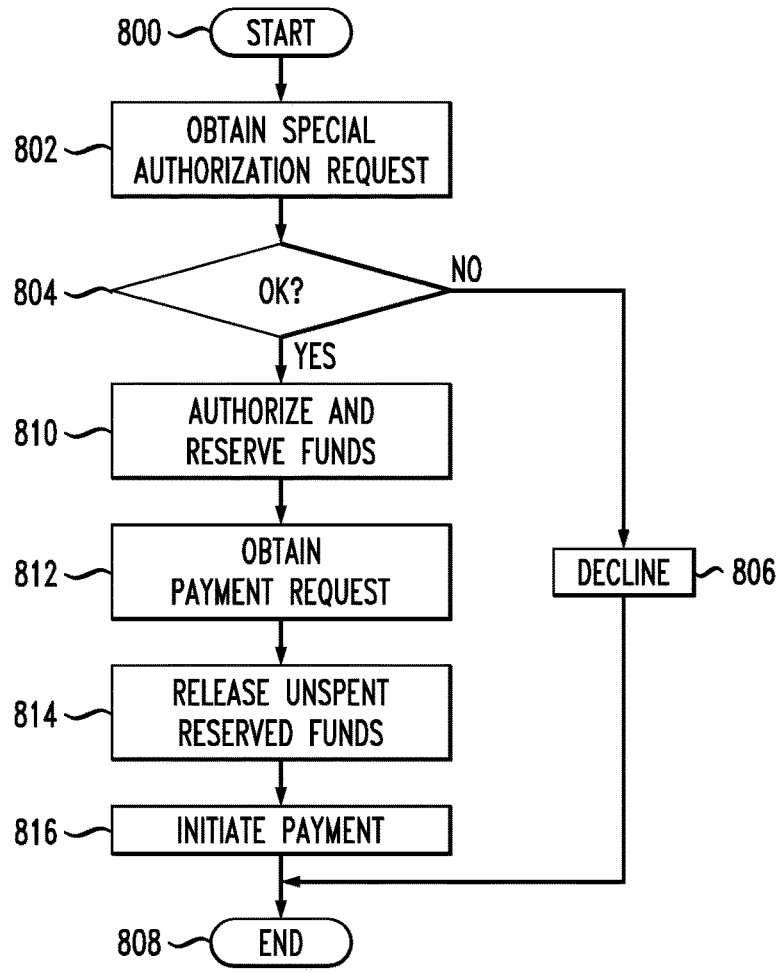
FIGS. 8A and 8B present a flow chart illustrating a sequence of steps performed in practicing certain aspects of the invention, from the perspective of an issuer.
Figure 8B:
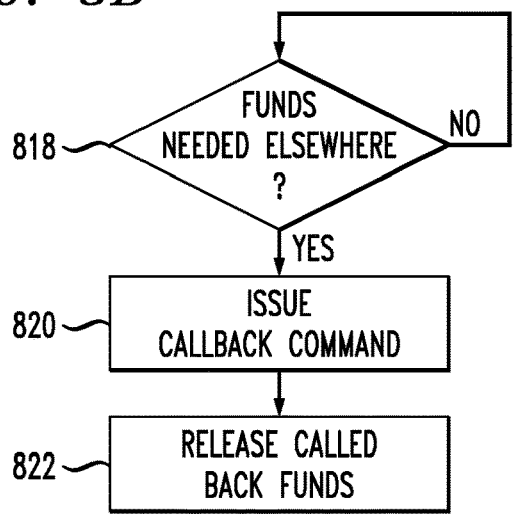

It will be appreciated that the discussion thus far in this recapitulation section has, in essence, been from the standpoint of the special spending environment. Discussion from the standpoint of the issuer will now be provided with respect to FIGS. 8A and 8B. In some instances. FIG. 8B is a parallel logical process to at least portions of that in FIG. 8A. FIG. 8A begins at 800. In step 802, the issuer obtains the special authorization request from the local authorization platform. If, in step 804, it is determined that the request should be denied ("NO" branch), the process ends at 808. If, in step 804, it is determined that the request should be granted ("YES" branch), send an affirmative authorization request response and reserve funds, in step 810. Upon receipt of a (special) payment request from the local authorization platform in step 812, release the unspent reserved funds in step 814 and initiate payment (e.g., through conventional clearing and settlement) in step 816, then end in step 808.

In another aspect, carry out, for example, at least steps 802, 804, and 810. Then, as in step 818 ("YES" branch), determine that funds are needed elsewhere (i.e., at least a portion of the funds reserved for the local authorization platform). Issue the special callback command in step 820, and release the called back funds for the other matter in step 822. As per the "NO" branch of block 818, checking for need of funds elsewhere can be ongoing (e.g., checking for a auth request from another source).

Even further aspects include an issuer authorization platform apparatus, including a memory; and at least one processor, coupled to the memory. The at least one processor is operative to carry out or otherwise facilitate any one, some, or all of the method steps described herein from the issuer's perspective. In at least some, cases, instructions for the at least one processor are stored in a tangible, computer-readable, recordable storage medium, or multiple such media.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126, a reader 132, payment devices such as cards 102, 112, 1302, 1420, a host, server, and/or processing center 140, 142, 144 (optionally with data warehouse 154) of a merchant, issuer, acquirer, processor, or operator of a network 2008 operating according to a payment system standard (and/or specification), a local authorization platform 312, 412, and the like. Firmware might be employed, for example, in connection with payment devices such as cards 102, 112, 1302, 1420 and reader 132. Firmware provides a number of basic functions (e.g. display, print, accept keystrokes) that in themselves do not provide the final end-use application, but rather are building blocks; software links the building blocks together to deliver a usable solution.

Figure 6:
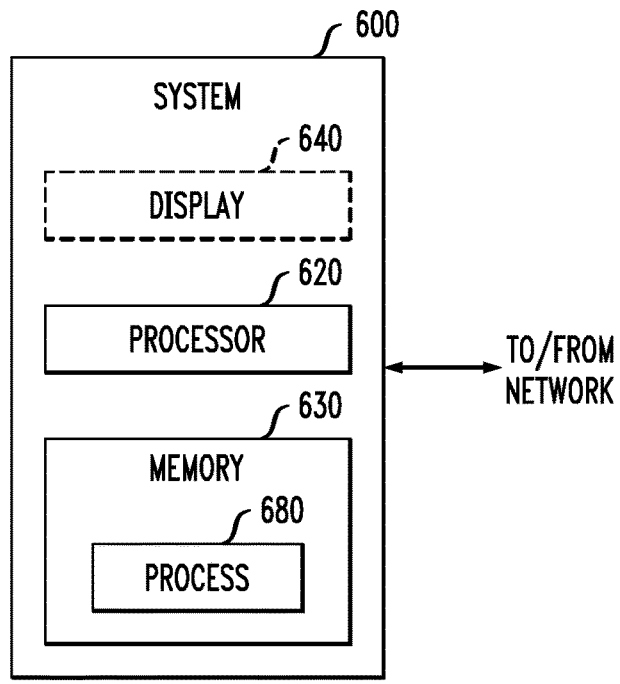
FIG. 6 is a block diagram of an exemplary computer system useful in one or more embodiments of the invention.

FIG. 6 is a block diagram of a system 600 that can implement part or all of one or more aspects or processes of the invention. As shown in FIG. 6, memory 630 configures the processor 620 (which could correspond. e.g., to processor portions 106, 116, 130; a processor of a reader 132; processors of remote hosts in centers 140, 142, 144; processors of hosts and/or servers implementing various functionality, a processor of local authorization platform 312, 412, and the like) to implement one or more aspects of the methods, steps, and functions disclosed herein (collectively, shown as process 680 in FIG. 6). Different method steps can be performed by different processors. The memory 630 could be distributed or local and the processor 620 could be distributed or singular. The memory 630 could be implemented as an electrical, magnetic or optical memory, or any combination of these or other types of storage devices (including memory portions as described above with respect to cards 102, 112). It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon.

The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal, another device could be a physical memory media associated with a local authorization platform, and/or another device could be a physical memory media associated with a processing center of an issuer or the like. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 124, 126, 140, 142, 144, 132, 2004, 2006, 2008, 2010, 312, 412, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 124, 126, 140, 142, 144, 132, 2004, 2006, 2008, 2010, 312, 412 can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 600 as shown in FIG. 6) running a server program. It will be understood that such a physical server may or may not include a display, keyboard, or other input/output components. A "host" includes a physical data processing system (for example, system 600 as shown in FIG. 6) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include one or more software and/or firmware modules on the card or other payment device, one or more software and/or firmware modules on the merchant terminal, a local authorization platform module running on a suitable server, an issuer platform module running on an issuer server, and one or more database modules in communication with one or more of the issuer server, the local authorization platform, or merchant terminal (including. e.g. on the corresponding server(s) or on one or more coupled database servers). The server on which the local authorization platform module runs is preferably located within the special spending environment, or at least coupled thereto by a reliable, high-speed data link. Such a server could be owned and/or controlled, for example, by a third-party organization, an acquiring entity, the merchant/environment, the operator of a payment processing network connecting one or more issuers with one or more acquirers, such as MasterCard International Incorporated of Purchase, N.Y., USA, or the like. In some instances, the module for the terminal has a white and/or blacklist and simple rules to handle the case when a connection is lost between the terminal and the local authorization platform. In at least some cases, the local authorization platform will hold or be coupled to a database having entries for all cards or other devices it believes are within the environment; against each card will be flagged whether the card is good or bad and whether there is any local balance available for that card. Thus, the database might include good cards with no local balance, which need to be authorized to the issuer each time; good cards with a local balance, and bad cards with no local balance. Entries for "bad" cards with a local balance would not normally be expected. The local authorization platform module would typically also include a rules engine module with logic to implement one, some, or all of the appropriate flow chart steps; for example, logic to obtain re-authorization including the correct amount therefor (possibly treating different cards in different ways); and so on. Logic could also be included to verify, for example, that the card holder is correctly presumed to be the real card holder (e.g. sufficiently recent PIN entry). The method steps can then be carried out using the distinct software modules of the system, as described above, executing on one or more hardware processors of the devices, servers, and so on. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 308, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C. C++, Java, Visual Basic, COBOL, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures. In at least some instances, messages may be in accordance with ISO standard 8583 (for example, authorization requests and authorization request responses). The ISO (International Organization for Standardization) 8583 standard for *Financial transaction card originated messages—Interchange message specifications* is known to the skilled artisan and is expressly incorporated herein by reference in its entirety for all purposes.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   detecting a payment device in a special spending environment;
   responsive to said detection, obtaining, by one or more processors of a local authorization platform, from an issuer of said payment device, an authorization and guarantee for a predetermined amount of funds spendable with said local authorization platform that is, one of, collocated in said special spending environment or linked to said special spending environment by a high-speed connection and that is separate from said issuer of said payment device and from said payment device, where a payment processing network and at least one acquiring entity are disposed between said local authorization platform and said issuer, and facilitate communication between said local authorization platform and said issuer;
   establishing, by said one or more processors, a pre-authorized balance, based on said predetermined amount of funds, on said local authorization platform;
   authorizing, by one or more processors, a series of purchases with said payment device within said special spending environment;
   adjusting, by one or more processors, said pre-authorized balance to reflect a value of said series of purchases;
   determining that said series of purchases is ended;
   communicating, by said one or more processors, a payment request to said issuer, causing said issuer to perform clearing and settlement of an aggregation of said series of purchases authorized by said one or more processors for a portion of said predetermined amount of funds actually spent in said series of purchases subsequent to determining that said series of purchases is ended; and
   facilitating, by said one or more processors, an immediate release, by said issuer, of said guarantee as to that portion of said predetermined amount of funds not actually spent in said series of purchases, said immediate release being subsequent to said determining that said series of purchases is ended,
   where said determining that said series of purchases is ended comprises receiving, from said issuer, a special callback command reducing the pre-authorized balance on said local authorization platform where said special callback command is issued in response to a security issue.

2. The method of claim 1, where said detecting said payment device in said special spending environment comprises determining that said payment device has been presented for a purchase within said special spending environment.

3. The method of claim 1, where said detecting said payment device in said special spending environment comprises detecting use of said payment device to enter said special spending environment.

4. The method of claim 1, where said detecting said payment device in said special spending environment comprises locally issuing said payment device for use within said special spending environment.

5. The method of claim 1, where said determining that said series of purchases is ended comprises determining that said payment device is no longer in said special spending environment.

6. The method of claim 1, where said determining that said series of purchases is ended comprises determining that said payment device has not been used for a predetermined period of time.

7. The method of claim 1, where said determining that said series of purchases is ended comprises detecting attempted use of said payment device outside said special spending environment.

8. The method of claim 1, where said determining that said series of purchases is ended comprises determining that said special spending environment has closed.

9. The method of claim 1, where said special callback command is received from said issuer in response to at least a portion of said pre-authorized balance established on said local authorization platform being needed elsewhere.

10. The method of claim 9, further comprising said issuer receiving an authorization request which cannot receive an affirmative response without said at least portion of said pre-authorized balance established on said local authorization platform.

11. The method of claim 1, where said special spending environment comprises at least one of a stadium, a festival, a bar, a night club, a theme park, a holiday park, a shopping center, and a shopping mall.

12. The method of claim 1, where said special spending environment comprises at least one of a transit system and a group of cooperating transit systems.

13. The method of claim 1, further comprising specifying said predetermined amount of funds based upon historical usage data.

14. The method of claim 1, further comprising, responsive to predetermined diminution of said pre-authorized balance, requesting, from said issuer of said payment device, a further authorization and guarantee for a further predetermined amount of funds that covers additional transactions within said special spending environment.

15. The method of claim 1, further comprising repeating all of said steps for an additional payment device.

16. The method of claim 1, further comprising:
maintaining a hot list of account numbers on said local authorization platform; and allowing said series of purchases only upon a successful check against said hot list.

17. The method of claim 1, further comprising making a receipt for said series of purchases available to a holder of said payment device, said receipt having individual transaction level detail.

18. The method of claim 17, where said receipt is not available from a payment terminal within said special spending environment.

19. The method of claim 18, where said receipt is made available at least one of a kiosk, a special terminal, a customer service desk, and a web site.

20. The method of claim 1, further comprising:
buffering issuer scripting commands in a memory of said local authorization platform; and
delivering said issuer scripting commands, buffered in said memory, to said payment device upon presentation of said payment device to a payment terminal in said special spending environment.

21. The method of claim 1, where said authorization and guarantee is requested from said issuer by sending a unique transaction code over said payment processing network.

22. The method of claim 1, further comprising said issuer placing a hold against said predetermined amount of funds in response to said request for said authorization and guarantee.

23. The method of claim 22, further comprising said issuer:
effectuating said payment as to only that portion of said predetermined amount of funds actually spent in said series of purchases; and
immediately releasing said hold as to that portion of said predetermined amount of funds not actually spent in said series of purchases.

24. The method of claim 1, where said immediate release of said guarantee is in response to an explicit communication.

25. The method of claim 1, where said immediate release of said guarantee is in response to said request for payment, based on a prior agreement.

26. The method of claim 1, further comprising requiring periodic entry of a personal identification number that permits said series of purchases to continue.

27. The method of claim 26, where said requiring comprises requesting entry at a location other than a payment terminal.

28. The method of claim 1, further comprising:
receiving an indication that said payment device has been at least one of lost and stolen; and
responsive to said indication, using said local authorization platform to carry out at least one of:
requiring entry of said personal identification number before further use of said payment device within said special spending environment; and
refusing further use of said payment device within said special spending environment.

29. The method of claim 1, further comprising determining, with said local authorization platform, that some putative purchases should not be included in said series of purchases for which said pre-authorized balance is adjusted, but should rather be subject to a conventional authorization process with said issuer.

30. A method comprising:
detecting a payment device in a special spending environment;
responsive to said detection, obtaining, by one or more processors of a local authorization platform, from an issuer of said payment device, an authorization and guarantee for a predetermined amount of funds spendable with said local authorization platform that is, one of, collocated in said special spending environment or linked to said special spending environment by a high-speed connection and that is separate from said issuer of said payment device;
establishing, by said one or more processors, a pre-authorized balance, based on said predetermined amount of funds, on said local authorization platform;
authorizing, by one or more processors, a series of purchases with said payment device within said special spending environment;
adjusting, by one or more processors, said pre-authorized balance to reflect a value of said series of purchases;
determining that said series of purchases is ended;
communicating, by said one or more processors, a payment request to said issuer for clearing and settlement of an aggregation of said series of purchases authorized by said one or more processors for a portion of said predetermined amount of funds actually spent in said series of purchases subsequent to determining that said series of purchases is ended; and
facilitating, by said one or more processors, an immediate release of said guarantee as to that portion of said predetermined amount of funds not actually spent in said series of purchases, said immediate release being subsequent to said determining that said series of purchases is ended,
where said determining that said series of purchases is ended comprises receiving, from said issuer, a special callback command reducing the pre-authorized balance on said local authorization platform,
where said special callback command is issued in response to a security issue.

* * * * *